US009599975B2

(12) United States Patent
Estevez et al.

(10) Patent No.: US 9,599,975 B2
(45) Date of Patent: Mar. 21, 2017

(54) SENSOR SYNCHRONIZED NETWORKS USING OVERLAPPING SENSOR FIELDS

(71) Applicant: Texas Instruments Incorporated, Dallas, TX (US)

(72) Inventors: Leonardo William Estevez, Rowlett, TX (US); Sriram Narayanan, Richardson, TX (US); Gangadhar Burra, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 491 days.

(21) Appl. No.: 14/278,661

(22) Filed: May 15, 2014

(65) Prior Publication Data

US 2015/0334353 A1    Nov. 19, 2015

(51) Int. Cl.
*G05B 15/02*     (2006.01)
*H04N 7/18*      (2006.01)
*H04W 52/02*     (2009.01)
*G05B 19/05*     (2006.01)

(52) U.S. Cl.
CPC ............ *G05B 15/02* (2013.01); *G05B 19/05* (2013.01); *G05B 19/054* (2013.01); *H04N 7/181* (2013.01); *H04W 52/0209* (2013.01); *H04W 52/0216* (2013.01); *H04W 52/0219* (2013.01); *H04W 52/0229* (2013.01); *H04W 52/0254* (2013.01); *G05B 2219/1133* (2013.01); *G05B 2219/163* (2013.01); *G05B 2219/2642* (2013.01); *G05B 2219/31251* (2013.01)

(58) Field of Classification Search
None
See application file for complete search history.

(56) References Cited

U.S. PATENT DOCUMENTS

| 7,884,727 | B2 | 2/2011 | Tran |
| 8,255,686 | B1 * | 8/2012 | Sharma ............. H05K 7/20836 380/200 |
| 2007/0228703 | A1 * | 10/2007 | Breed ................. B60N 2/0232 280/735 |
| 2012/0245890 | A1 | 9/2012 | Wark et al. |

* cited by examiner

*Primary Examiner* — Sulaiman Nooristany
(74) *Attorney, Agent, or Firm* — John R. Pessetto; Charles A. Brill; Frank D. Cimino

(57) ABSTRACT

A method of synchronizing includes providing a sensor network including sensor nodes having object recognition sensors (ORS's) and building automation network nodes. The ORS's have partially overlapping fields of view in a sensed overlap area in the building. Movement of an individual through the sensed overlap area triggers dynamic synchronizing with the first sensor node waking up and sending a first RF request to join a subnet and for a schedule of wakeup times, the first sensor node receiving a response from any sensor node that receives the first request including synchronization information having times the first sensor node should wake up. The second sensor node is activated by the individual's movement and sends a second RF message to join the subnet and for a schedule of wakeup times. The first sensor node receives the second RF message and in response sends the synchronization information to the second sensor node.

20 Claims, 3 Drawing Sheets

| TIME PRESENT | PERIODIC SYNCHRONIZATION RADIO TIME | DYNAMIC SYNCHRONIZATION RADIO TIME |
|---|---|---|
| 5 MINUTES THERE 5 MINUTES GONE | 40 X BEACON(5ms) | 500ms INITIAL SYNC + 20 X BEACON |
| AN HOUR THERE AN HOUR GONE | 240 X BEACON(5ms) | 500ms INITIAL SYNC + 120 X BEACON |
| 8 HOURS THERE 8 HOURS GONE | 1920 X BEACON(5ms) | BEACON + 960 X BEACON |

FIG. 4

SENSOR SYNCHRONIZED NETWORKS USING OVERLAPPING SENSOR FIELDS

FIELD

Disclosed embodiments relate generally to wireless sensor communications, and more specifically to methods and systems for synchronizing RF communications between sensor nodes in a wireless sensor network.

BACKGROUND

Building owners may seek to decrease their power by reducing heating, ventilating and cooling ("HVAC") and lighting. One method to reduce HVAC is to select minimum and maximum setback temperatures for a room when the room is not occupied. Motion detection devices at sensor nodes including RF transceivers (RF sensor nodes) that collectively form a RF sensor network are known for determining which rooms are occupied at any given time, and to relay this information to a building automation network controller. Motion detection devices can be based on sonic or ultrasonic/acoustical detectors, photoelectric break-beam devices, passive infrared (PIR) detectors, video systems, and radar or microwave-based systems. The building automation network controller then provides control signals which result in HVAC equipment allocating an appropriate amount of cooled/heated air to each of a plurality of areas (e.g., rooms) within the building based on the number of people occupying those areas.

Sensor nodes in conventional RF sensor networks are typically synchronized through periodic Radio Frequency (RF) beacon signals which are transmitted throughout the sensor nodes in the network regardless of whether or not a message needs to be propagated through the sensor network. Such periodic beacons, such as being transmitted every 30 seconds, although effective for their intended node synchronization function, expend a significant amount of power. The power expended for conventional periodic beacons can be particularly problematic for sensor nodes that may have limited battery resources. Much of energy (power) management activity has been directed toward adjustment of the sampling frequency to conserve power.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize in sensor network applications having limited battery resources, power consumption at the sensor nodes due to periodic radio frequency (RF) beacon transmissions for synchronization can be an important factor. Accordingly, for sensor network applications where messaging events in the network may occur infrequently or specific to only some subnet of the network nodes, a sensor synchronized subnet model may used, which disclosed embodiments provide. Disclosed methods dynamically (or adaptively) synchronize RF communications for a plurality of sensor nodes in a wireless sensor network, such as from sleep into startup (or wakeup), enabled by object recognition sensor (ORS's) which are utilized to help reduce power consumption by leveraging subnets to synchronize the network, rather than by always using conventional periodic beaconing which generally require all sensor nodes to participate to accomplish network synchronization irrespective of the activity level to establish the communication network to enabling relaying of the occupancy information.

Disclosed embodiments include a method of synchronizing a sensor network including a building automation network coordinator (master) node having at least one master RF transceiver system and a plurality of sensor nodes including a first sensor node having a first ORS coupled to a first RF transceiver system, and a second sensor node including a second ORS coupled to a second RF transceiver system. The building automation network coordinator node generally has continuous power supply, and is continuously listening, which is typically at the entry point of a building. The first ORS and second ORS (typically both generally secured to walls) have partially overlapping fields of view in a sensed overlap area in a building. As used herein ORS sensors having "partially overlapping fields of view in a sensed overlap area" refers to areas in which two (or more) ORS receive energy from that reach the ORS's with an energy that is above their threshold energy to enable transducing the receive energy into an electrical output signal when an individual is within or is moving across that overlap area.

Disclosed embodiments can use any ORS that transduces a signal associated with an object (e.g., an individual) within a 3-dimensional space corresponding to its sensed area to enable recognition of the object (e.g., individual) within the space. For example, the ORS can comprise a passive infrared (PIR) sensor which responds to human warmth; a frequency-tuned microphone which responds to a particular acoustic stimulus, or a filtered optical sensor which may be tuned to electromagnetic radiation of a particular wavelength(s). In the case of a PIR sensor, an electrical signal is generated when optical energy received is above its threshold optical field, such as when an individual is within or is moving across its sensed area.

Movement of at least one individual through the sensed overlap area triggers the first sensor node to wakeup from sleep and send a first RF request to join a subnet within the sensor network and for a schedule of wakeup times. The first sensor node receives a response from any of the plurality of sensor nodes that receives the first RF request, where the response received includes synchronization information comprising future times the first sensor node should wake up for RF communications. The second sensor node is activated at a first time by the individual's movement and sends a second RF message to join the subnet and for a schedule for wakeup times. The first sensor node receives the second RF message and in response requests the first sensor node to send the synchronization information to the second sensor node.

At a second time after the first time a subset of plurality sensor nodes in the subnet can relay occupancy information for at least a first portion (e.g., a room) within the building including the overlap area to the automation network coordinator node, which can use the occupancy information, such as to control power usage in one or more rooms in the building. Responsive to receiving the occupancy information from the subnet the building automation network coordinator node can send a RF beacon control signal which includes information regarding an amount of power allocated for at least a first portion (e.g., a room) in the building including the sensed overlap area for power usage including for a heating, ventilating and cooling (HVAC) unit and/or for lighting for the first portion, or the RF beacon control signal can include information to control all HVAC units and lighting throughout the building. The control signal can result in the power allocated being based on the number of individuals occupying the respective portions of the building. Besides HVAC control, disclosed embodiment may be used for smart displays, security surveillance, lighting control, or other intelligent human-building interface technologies.

BRIEF DESCRIPTION OF THE DRAWINGS

Reference will now be made to the accompanying drawings, which are not necessarily drawn to scale, wherein:

FIG. 4 is a table that compares radio on-time for periodic beaconing as compared to disclosed dynamic synchronization for different activity profiles that provides evidence how based on a predicted activity level switching between utilizing disclosed dynamic synchronizing and utilizing periodic beaconing for synchronizing can save power.

DETAILED DESCRIPTION

Figure 1:
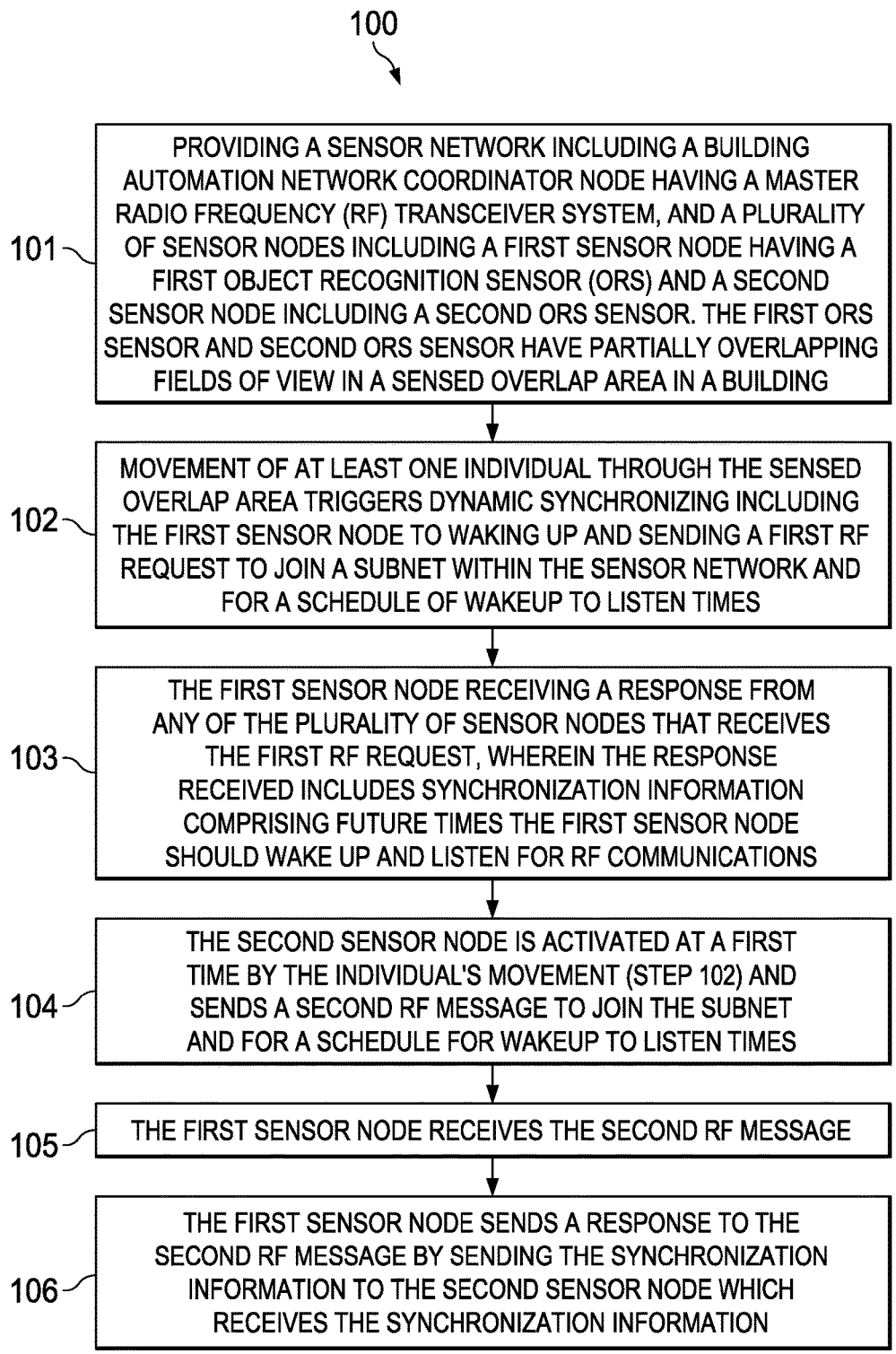
FIG. 1 is a flow chart that shows steps in an example method of dynamically synchronizing sensor nodes in a sensor network where adjacent ORS's provide partially overlapping fields of view in a sensed overlap area, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like such as "connected to") as used herein in the electrical context without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of dynamic synchronizing sensor nodes in a sensor node network, according to an example embodiment. Step 101 comprises providing a sensor network including a building automation network coordinator node having a master RF transceiver system, and plurality of sensor nodes including a first sensor node having a first ORS coupled to a first RF transceiver system and a second sensor node including a second ORS coupled to a second RF transceiver system. The first ORS and second ORS have partially overlapping fields of view in a sensed overlap area in a building between the first and second sensor node.

The network coordinator node has a master RF transceiver system to enable RF acknowledgements to be sent responsive to communications received from the respective sensor nodes in the network. As noted above, The ORS can comprise any sensor that transduces a signal associated with an object (e.g., an individual) within a 3-dimensional space corresponding to its sensed area to enable recognition of the object within the space. For example, as noted above, the ORS can comprise a PIR sensor which responds to human warmth; a frequency-tuned microphone which responds to a particular acoustic stimulus, or a filtered optical sensor which may be tuned to electromagnetic radiation light of a particular wavelength(s).

A PIR sensor is known to be an electronic sensor that measures IR radiation radiating from objects in its field of view. The PIR sensor is typically mounted on a printed circuit board containing the necessary electronics required to interpret the signals from the sensor itself. The complete assembly is usually contained within a housing, mounted in a location that (generally secured to a wall) where the ORS can sense a desired area to be monitored, such as for monitoring the presence and movement of individuals as disclosed herein.

In step 102, movement of at least one individual through the sensed overlap area triggers dynamic synchronizing including the first sensor node waking up and sending a first RF request to join a subnet within the sensor network and for a schedule of wakeup to listen times. In step 103 the first sensor node receives a response from any of the plurality of sensor nodes that that receives the first RF request, where the response includes synchronization information comprising future times the first sensor node should wake up and listen for RF communications.

In step 104 the second sensor node is activated at a first time by the movement (step 102) and sends a second RF message to join the subnet and for a schedule for wakeup to listen times. Step 105 comprises the first sensor node receiving the second RF message which it is guaranteed to receive because it is listening for RF communication while its ORS (e.g., a PIR is active, i.e., receiving IR from a proximate individual). Step 106 comprises the first sensor node sending a response to the second RF message by sending the synchronization information to the second sensor node which should reliably receive the synchronization information because the ORS fields of the first ORS and second ORS include a sensed overlap area.

At a second time after the first time a subset of the plurality sensor nodes in the subnet can relay occupancy information for a first portion of the building (e.g., a conference room) including the overlap area to the building automation network coordinator node. Use of a subset of the plurality sensor nodes in the subnet reduces power usage in the sensor network because as part of a building automation network/system, occupancy sensing can significantly reduce energy consumption. For example, lighting, and HVAC can represent over 50% of total building energy use. Occupancy sensing can reduce the use of lighting and heating and air conditioning and reduce the annual energy cost for a conference room by about half. Besides HVAC control, as noted above, disclosed embodiments can also be used to control smart displays, security surveillance, lighting control, and other intelligent human-building interface technologies.

The sensor nodes selected for the subset for synchronizing can be enabled by the overlapping sensed overlap areas. In this embodiment, the sensor nodes which can reliably hear sensor nodes further down the sensor network can instruct the in-between (intermediate) sensor nodes to stop waking up for communications.

Intermediate nodes can thus notify their neighbors of new listen times to replace their otherwise periodic beacon communications (and thus stop periodically waking up). For example, in the simplest case of 3 sensor nodes in a linear series (see left sensor node 301, center sensor node 302 and right sensor node 303 described below relative to FIG. 3), the center sensor node 302 can inform the left sensor node 301 of the right sensor node's 303 scheduled listen times. The left sensor node 301 can inform the center sensor node 302 that it can reliably hear the right sensor node 303 and that the center sensor node 302 as a relay is no longer needed. The center sensor node 302 can then thus stop waking up to relay information. The left sensor node 301 can then repeat this same process with another node to its left and with the original right sensor node 303.

Generally, responsive to receiving the occupancy information from the sensor nodes the building automation network coordinator (master) node can send a RF beacon control signal which includes information regarding an amount of power allocated for at least a first portion (e.g., a meeting/conference room) in the building including the sensed overlap area or to all HVAC units and lights in the building. The control signal can also be over a wired connection, such as to all HVAC units in the building. However, in the case of large buildings although there is a wireless to wired entry point to the HVAC units, customers generally want wireless/energy harvesting deployments of sensor nodes with only a few gateways in such large buildings.

Figure 2:
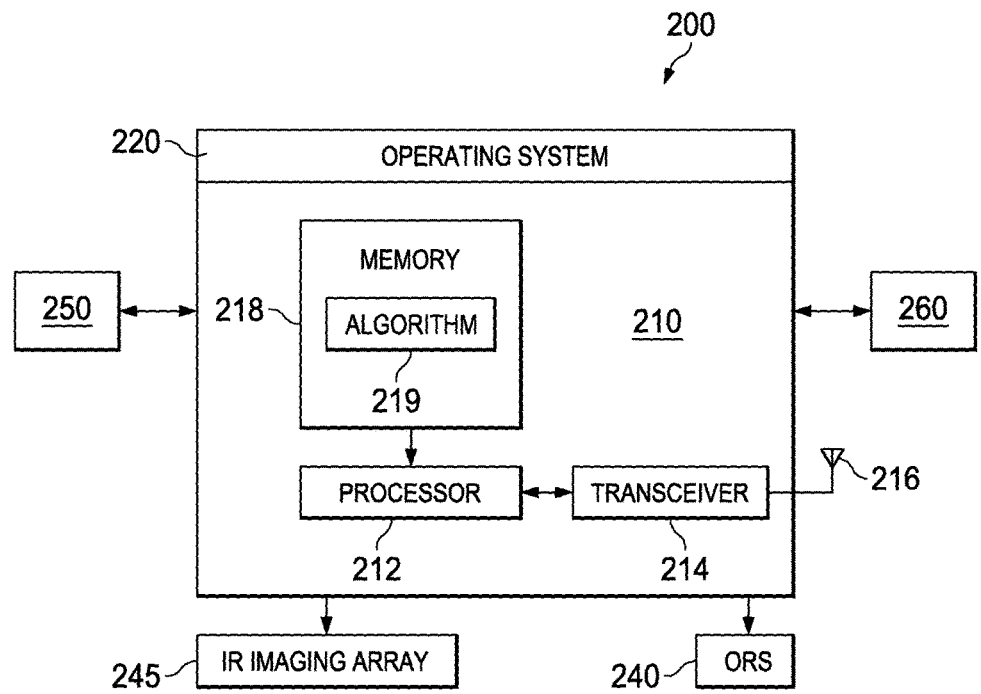
FIG. 2 is a diagram of example wireless sensor node architecture including a memory storing an algorithm executed by a processor that implements a disclosed method of dynamically synchronizing sensor nodes in a sensor network enabled by ORS's providing partially overlapping fields of view in a sensed overlap area, according to an example embodiment.

FIG. 2 is a diagram of example architecture for a wireless sensor node 200 including a memory 218 storing an algorithm 219 executed by a processor 212 that implements a disclosed method of dynamically synchronizing sensor nodes, according to an example embodiment. Wireless sensor node 200 is shown including hardware 210 including a processor 212 accessing the memory 218 which stores a disclosed algorithm 219 which implements a method of dynamically synchronizing sensor nodes, and a radio transceiver system 214 coupled to an antenna 216. The hardware 210 performs computations, communications, and local information storage. The hardware 210 is programmed with an operating system 220.

An ORS 240 is shown included. Wireless sensor node 200 is also shown including an IR imaging array 245. The IR imaging array 245 is operable to determine the number of individuals in a room as well as the personal identify of the individuals in the room based on their particular IR signatures. An optional energy storage module 250 includes an energy storage device (e.g., a battery or supercapacitor) and a tracking device for tracking the current amount of power stored at the wireless sensor node 200. An optional energy harvesting module 260 harvests energy from the ambient, such as by converting inductive, solar or kinetic energy into energy (generally electrical energy) which can be stored in energy storage module 250.

Figure 3:
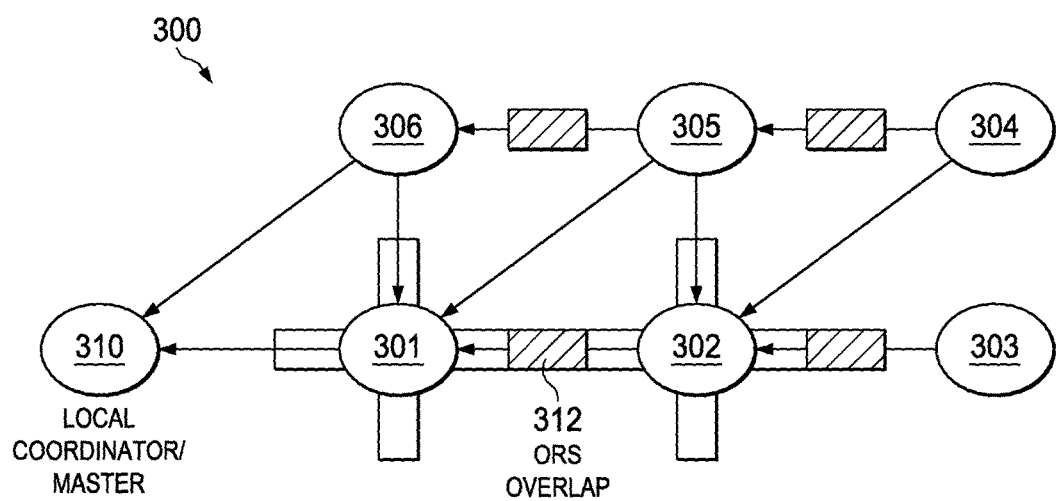
FIG. 3 is a simplified depiction of an example building automation network that can utilize a disclosed algorithm which a processor uses to implement a disclosed method of dynamically synchronizing sensor nodes in a sensor network including a local coordinator/master node and a plurality of master/slave nodes each having an ORS, where the master/slave nodes are positioned so as to provide ORS overlap regions between adjacent master/slave nodes, according to an example embodiment.

FIG. 3 is a simplified depiction of an example building automation network 300 that can utilize a disclosed algorithm which a processor uses to implement a disclosed method of dynamic synchronizing sensor nodes including a local coordinator/master node 310 and a plurality of master/slave nodes including left sensor node 301, center sensor node 302, right sensor node 303, and sensor nodes 304, 305 and 306 each having an ORS, where the master/slave nodes are positioned so as to provide ORS overlap regions between adjacent master/slave nodes, according to an example embodiment. An ORS overlap region between master/slave sensor nodes 301 and 302 is shown having reference number 312. The local coordinator/master node 310 can be identified post-deployment based on learned power demands. Also, the energy storage device can be adjusted based on a learned energy budget for respective sensor nodes.

Regarding learning traffic patterns and identifying local coordinator nodes, assume the building automation network 300 is not already synchronized and RF messages are programmed to be propagated within 2 minutes and can be sent every 30 s originating from the local coordinator/master node 310 to master/slave nodes including a left sensor node 301, center sensor node 302, and right sensor node 303 shown in FIG. 3 which are arranged in a line (e.g., such as along a wall). A conventional RF synchronized network may always transmit a beacon every 30 s to synchronize all four sensor nodes 310, 301, 302, and 303. One disclosed embodiment considers a specific use case, whether it is recognized to make power sense to bring only parts of the sensor network (a subnet) out of sleep when needed, and to put them back to sleep when not needed. When in sleep node the nodes can wake up for brief periods on a schedule to become involved in periodic beaconing.

For the case of occupancy sensing, synchronization enabled by beaconing may be initiated via adjacent sensor nodes. For example, significant changes in IR levels detected by PIR sensors in an overlap region between center sensor node 302 and the right sensor node 303 which is an end device can initiate advertisement by the right sensor node 303 and listening by the center sensor node 302. Once the advertisement is received by the center sensor node 302 from the right sensor node 303, center sensor node 302 can go to sleep for a predefined period and wake up for the next advertisement at an anticipated time. If the right sensor node 303 stops advertising and the center node 302 does not have any individuals in its sensed field, the center node 302 can also stop advertising.

Disclosed embodiments include node activation through statistical learning methods, which includes learning energy demands, subnet creation and teardown and implementation of statistical learning. Statistical learning methods can be used to compute sensor node energy requirements, including for local coordinator nodes, and for an asymmetric energy supply (batteries, harvester, mains powered). Statistical learning methods can assist in network creation and tear down, based on a probabilistic knowledge of "frequent" and "infrequent" paths taken by individuals.

Regarding the embodiments that involve learning energy demands, for example, using the building automation network 300 arrangement shown in FIG. 3, assume the movement of an individual sequentially activates sensor node 306, sensor node 305, and then he or she sits under sensor node 304 which is an end sensor device. Sensor node 306 wakes up once its ORS threshold is crossed as the individual walks by. Sensor node 306 starts listening for other nodes as soon as its energy level drops beneath its threshold. Sensor node 305 does the same thing as sensor node 306 as the individual walks by. Assume after 5 minutes, the individual exits. A predetermined time later (e.g., a minute later) the entire building automation network 300 including sensor nodes 301 to 306 can go back to sleep.

Again using the building automation network 300 arrangement shown in FIG. 3, assume the individual sits in his or her spot for an hour instead of five minutes. The ORS sensor (sensor node 304) at this location registers this activation with stored movement patterns previously associated with an individual sitting there for at least an hour at a time and a disclosed algorithm can make predictions for co-activations of neighboring sensor nodes based on these previous co-activations. If there was a cubicle wall constraining this individual's movement at the top part of FIG. 3, that co-activation would never have previously occurred and so would never be predicted to occur. That sensor would at first be activated several times and would after a predetermined number of activations stop synchronizing because an individual from the neighboring node never actually moves into that node's central space (i.e., its only overlapping space).

In another embodiment a disclosed algorithm becomes personalized by including specific code to account for individual' patterns of human behavior/motion within the building, and there can be a separate model for any of the individuals (e.g., working) in the building. Personal identity may be determined by using an IR signature obtaining by an IR imaging array such as the IR imaging array 245 shown in FIG. 2 which is recognized to be able to recognize the number of people in a room as well as distinguish different individuals to determine where in the building each individual spends most of their time. Other known methods of determining personal identify can also be used. An advantage of personalized models for sensor network energy management is that predictions where a person will go in the building throughout a day can be more accurately made to enable saving significant power. Individual patterns of human motion within a building can be determined by determining:

1. The probability of specific individuals being in a sensed area over some predetermined prolonged period of time (e.g., one week), which can be first determined by IR imaging array observation.
2. Areas referred to as "traffic areas" in which individual(s) are found to persist repeatedly for predetermined minimum periods of time, typically being meeting rooms, are given an identity (not necessarily from a single person).
3. Statistics for movement patterns of the individuals to and from these traffic areas are collected.
4. The statistics for movement patterns in 3 can be used to predict most likely paths for individuals moving to and from specific traffic areas.

For example, consider a cubicle environment in a building and assume an ORS being used as an occupancy sensor can cover 4 cubes. Knowledge of separating walls in the cubicle environment can further constrain predictions where an individual will go. In a cubicle environment the probability of exiting to one side or another of a cubicle aisle is the same until the system (over time) models that if an activation has occurred to only one side of the aisle, the probability of it occurring on the other side is zero. Accordingly, the system can learn patterns of movement by collecting probabilities, and learning not only the most likely pattern of movements for individuals in an area, but also learning constraints in an area where multiple individuals might spend long periods of time. This approach would generally not be applied to conference rooms because a different model would be used since a different group of people would be going into a conference room, such as every hour.

Regarding subnet creation and teardown, historical traffic pattern probabilities can be used to initiate subnet creation and teardown. This allows for "plug-and-play" operation of networks. This also enables conservation of energy by tearing down unused subnets. Statistical learning can minimize power use without impacting network performance.

Regarding implementation of statistical learning methods, each sensor node can maintain local traffic probabilities. Sensor nodes can update local probability based on their own observation and neighboring sensor node' observations. Sensor nodes can update local probability information to determine when to initiate/leave the network.

FIG. 4 is a table that compares radio on-time for known periodic beaconing as compared to disclosed dynamic synchronization for three example activity profiles, assuming for periodic beaconing beacons to take place regardless of activity/whether or not a message needs to be propagated through the network, where there are 5 msec beacons every 30 sec. In the "time present" column "there" refers to an individual being physically present in the sensed area and "gone" refers to an individual not being physically present in the sensed area. For the 5 min/5 min profile, the dynamic synchronization comprised a 500 msec initial synchronization and 20 5 msec beacons, equal to a total 600 msec radio time. The known periodic beaconing for the 5 min/5 min profile involved 40 5 msec beacons or 200 ms radio time. For the 5 min/5 min profile, periodic beaconing is thus more power efficient. For the 1 hr/1 hr profile, the dynamic synchronization comprised 1,100 msec of radio time, while for the 1 hr/1 hr profile, periodic beaconing comprised 1,200 msec of radio time, so that dynamic synchronization is more somewhat more power efficient. For the 8 hr/8 hr profile, the dynamic synchronization comprised 5,300 msec of radio time, while for the 8 hr/8 hr profile, periodic beaconing comprised 9,600 msec of radio time, so that dynamic synchronization is substantially more somewhat more power efficient as compared to periodic beaconing. In the dynamic model, the decision to power down the network after a given period of absence is learned, otherwise the penalty for resynchronizing the network makes the approach unattractive power-wise. Real behavioral patterns are captured by ORS's for evaluation.

FIG. 4 shows dynamic synchronization provides a power saving benefit over conventional periodic beaconing during relatively long periods of inactivity, while conventional periodic beaconing provides a power saving benefit over dynamic synchronization during relatively short periods of inactivity (frequent individual traffic into the sensed region, such as a conference room). Accordingly, in one disclosed embodiment, sensor nodes in one or more subnets are switched between dynamic synchronization and conventional periodic beaconing depending on the predicted period of activity/inactivity, where dynamic synchronization can be used when the period of inactivity is predicted from the model to be above a predetermined limit and conventional beaconing can be used when the period of inactivity is predicted to be below a predetermined limit.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of synchronizing a sensor network, comprising:
providing said sensor network including a building automation network coordinator node having a master radio frequency (RF) transceiver system, and a plurality of sensor nodes including a first sensor node having a first proximate object recognition sensor (ORS) coupled to a first RF transceiver system and a second sensor node including a second ORS coupled to a second RF transceiver system, wherein said first ORS and said second ORS have partially overlapping fields of view in a sensed overlap area in a building, wherein movement of at least one individual through said sensed overlap area triggers dynamic synchronizing including:
said first sensor node waking up and sending a first RF request to join a subnet within said sensor network and for a schedule of wakeup times;
said first sensor node receiving a response from any of said plurality of sensor nodes that receives said first RF request, said response including synchronization information comprising future times said first sensor node should wake up for RF communications;
said second sensor node activating at a first time by said movement and sends a second RF message to join said subnet and for a schedule for wakeup times, and
said first sensor node receiving said second RF message and in response said first sensor node sends said synchronization information to said second sensor node.

2. The method of claim 1, wherein at a second time after said first time a subset of said plurality of sensor nodes in said subnet relay occupancy information for at least a first area portion within said building including said sensed overlap area to said automation network coordinator node.

3. The method of claim 1, further comprising:
determining a personalized probability for a plurality of said individuals being in a plurality of different area portions within said building over a predetermined minimum period of time by observations provided by said plurality of sensor nodes;
establishing an identity for at least one traffic area having at least a third sensor node of said plurality of sensor nodes therein in which a first individual of said plurality of said individuals is found to be within a plurality of times during said predetermined minimum period of time;
collecting statistics for movement patterns of said first individual towards and away from said traffic area;
using said statistics, determining predicted paths by said first individual when moving towards and away from said traffic area, and
using said predicted paths to reduce a time being activated by said third sensor node.

4. The method of claim 3, wherein said predicted paths include consideration for building features including walls which render unlikely or impossible movement paths.

5. The method of claim 3, further comprising switching between utilizing said dynamic synchronizing and utilizing periodic beaconing based on a predicted activity level of said first individual in said traffic area using said statistics.

6. A method of synchronizing a sensor network, comprising:
providing said sensor network including a building automation network coordinator node having a master radio frequency (RF) transceiver system, and a plurality of sensor nodes including a first sensor node having a first passive infrared (PIR) sensor coupled to a first RF transceiver system and a second sensor node including a second PIR sensor coupled to a second RF transceiver system, wherein said first PR sensor and said second PIR sensor have partially overlapping fields of view in a sensed overlap area in a building, wherein movement of at least one individual through said sensed overlap area triggers dynamic synchronizing including:
said first sensor node waking up and sending a first RF request to join a subnet within said sensor network and for a schedule of wakeup times;
said first sensor node receiving a response from any of said plurality of sensor nodes that that receives said first RF request, said response including synchronization information comprising future times said first sensor node should wake up for RF communications;
said second sensor node activating at a first time by said movement and sends a second RF message to join said subnet and for a schedule for wakeup times, and
said first sensor node receiving said second RF message and in response said first sensor node sends said synchronization information to said second sensor node.

7. The method of claim 6, wherein at a second time after said first time a subset of said plurality of sensor nodes in said subnet relay occupancy information for at least a first area portion within said building including said sensed overlap area to said automation network coordinator node.

8. The method of claim 7, wherein responsive to receiving said occupancy information said automation network coordinator node sends a RF beacon control signal which includes information regarding an amount of power allocated for equipment including at least heating, ventilation, and air conditioning (HVAC) equipment servicing said first area portion.

9. The method of claim 7, wherein said first area portion comprises a meeting room.

10. The method of claim 6, wherein said plurality of sensor nodes comprise energy harvesting nodes including an energy harvester.

11. The method of claim 6, further comprising:
determining a personalized probability for a plurality of said individuals being in a plurality of different area portions within said building over a predetermined minimum period of time by observations provided by said plurality of sensor nodes;
establishing an identity for at least one traffic area having at least a third sensor node of said plurality of sensor nodes therein in which a first individual of said plurality of said individuals is found to be within a plurality of times during said predetermined minimum period of time;
collecting statistics for movement patterns of said first individual towards and away from said traffic area;
using said statistics, determining predicted paths by said first individual when moving towards and away from said traffic area, and
using said predicted paths to reduce a time being activated by said third sensor node.

12. The method of claim 11, wherein said predicted paths include consideration for building features including walls which render unlikely or impossible movement paths.

13. The method of claim 11, further comprising switching between utilizing said dynamic synchronizing and utilizing periodic beaconing based on a predicted activity level in said traffic area using said statistics.

14. A computer program product, comprising:
a non-transitory data storage medium that includes program instructions executable by a processor to enable said processor to execute a method of synchronizing a sensor network including a building automation network coordinator node having a master radio frequency (RF) transceiver system and a plurality of sensor nodes including a first sensor node having a first object recognition sensor (ORS) coupled to a first RF transceiver system and a second sensor node including a second ORS coupled to a second RF transceiver system, wherein said first ORS and said second ORS have partially overlapping fields of view in a sensed overlap area in a building, said computer program product including code for triggering dynamic synchronizing responsive to sensed movement of at least one individual through said sensed overlap area including:
code for said first sensor node waking up and sending a first RF request to join a subnet within said sensor network and for a schedule of wakeup times;
code for said first sensor node to receive a response from any of said plurality of sensor nodes that that receives said first RF request, said response including synchronization information comprising future times said first sensor node should wake up for RF communications;
code for activating said second sensor node at a first time by said movement and send a second RF message to join said subnet and for a schedule for wakeup times, and
code for said first sensor node to receive said second RF message and in response to said second RF message said first sensor node to send said synchronization information to said second sensor node.

15. The computer program product of claim 14, wherein at a second time after said first time a subset of said plurality of sensor nodes in said subnet relay occupancy information for at least a first area portion within said building including said sensed overlap area to said automation network coordinator node.

16. The computer program product of claim 15, wherein said first area portion comprises a meeting room.

17. The computer program product of claim 14, further comprising code for:
determining a personalized probability for a plurality of said individuals being in a plurality of different area portions within said building over a predetermined minimum period of time by observations provided by said plurality of sensor nodes;
establishing an identity for at least one traffic area having at least a third sensor node of said plurality of sensor nodes therein in which a first individual of said plurality of said individuals is found to be within a plurality of times during said predetermined minimum period of time;
collecting statistics for movement patterns of said first individual towards and away from said traffic area;
using said statistics, determining predicted paths by said first individual when moving towards and away from said traffic area, and
using said predicted paths to reduce a time being activated by said third sensor node.

18. The computer program product of claim 17, wherein said predicted paths include consideration for building features including walls which render unlikely or impossible movement paths.

19. The computer program product of claim 17, further comprising code for switching between utilizing said dynamic synchronizing and utilizing periodic beaconing based on a predicted activity level in said traffic area using said statistics.

20. The computer program product of claim 14, wherein said first and second ORS each comprise a passive infrared (PIR) sensor.

* * * * *